United States Patent [19]

Janssen et al.

[11] Patent Number: 5,669,589
[45] Date of Patent: Sep. 23, 1997

[54] PIPE AND CABLE CLAMP WITH BASE PART AND RECEIVING STRAP

[75] Inventors: Rupert Janssen, Meiningen; Markus Fröwis, Frastanz, both of Austria; Luc Guillon, Sax, Switzerland

[73] Assignee: Hilti Aktiengesellschaft, Furstentum, Liechtenstein

[21] Appl. No.: 527,908

[22] Filed: Sep. 14, 1995

[30] Foreign Application Priority Data

Sep. 15, 1994 [DE] Germany .............. 44 32 780.3

[51] Int. Cl.$^6$ ................................................ F16L 3/08
[52] U.S. Cl. ...................................... 248/65; 248/71
[58] Field of Search ................ 248/65, 68.1, 71, 248/74.2, 909

[56] References Cited

U.S. PATENT DOCUMENTS

| | | | |
|---|---|---|---|
| 1,476,836 | 12/1923 | Pleister | 248/909 X |
| 1,736,707 | 11/1929 | Lake | 248/71 X |
| 2,298,560 | 10/1942 | Harrison | 248/71 |
| 2,681,196 | 6/1954 | Lind | 248/71 |
| 3,951,367 | 4/1976 | Hagelberg | 248/71 |
| 4,083,523 | 4/1978 | Fisher | 248/74.2 |
| 4,370,082 | 1/1983 | Sundberg | 248/71 X |
| 4,997,148 | 3/1991 | Sherman | 248/74.2 X |

FOREIGN PATENT DOCUMENTS

| | | | |
|---|---|---|---|
| 2633528 | 2/1977 | Germany . | |
| 9004269 | 6/1990 | Germany . | |
| 696181 | 10/1965 | Italy | 248/65 |

*Primary Examiner*—Leslie A. Braun
*Assistant Examiner*—Willie Berry, Jr.
*Attorney, Agent, or Firm*—Anderson, Kill & Olick, P.C.

[57] ABSTRACT

A pipe and cable clamp is formed of a base part (1) and a generally arcuately shaped receiving strap (2) extending outwardly from the base part. A joint (3) is located in the receiving strap (2) spaced from the free end (2a) and the joint is shaped so that the free end region extending from the joint can be folded into a receiving space bounded by the receiving strap. As a result, pipes and cables of different diameters can be secured to the structural member, so that the free end region 2b is folding into receiving space when smaller diameter pipes and cables are clamped, and the free end region 2b is prevented from folding outwardly if larger diameter pipes are clamped, so that the free end region assists in securing the pipes and cable of larger diameter.

4 Claims, 1 Drawing Sheet

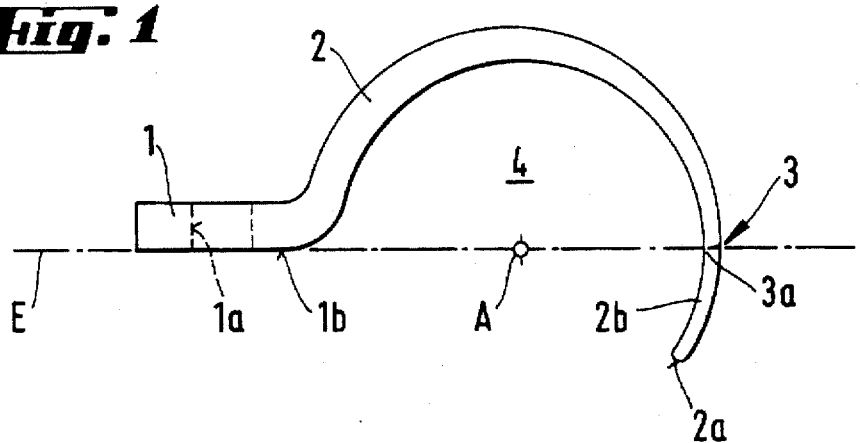
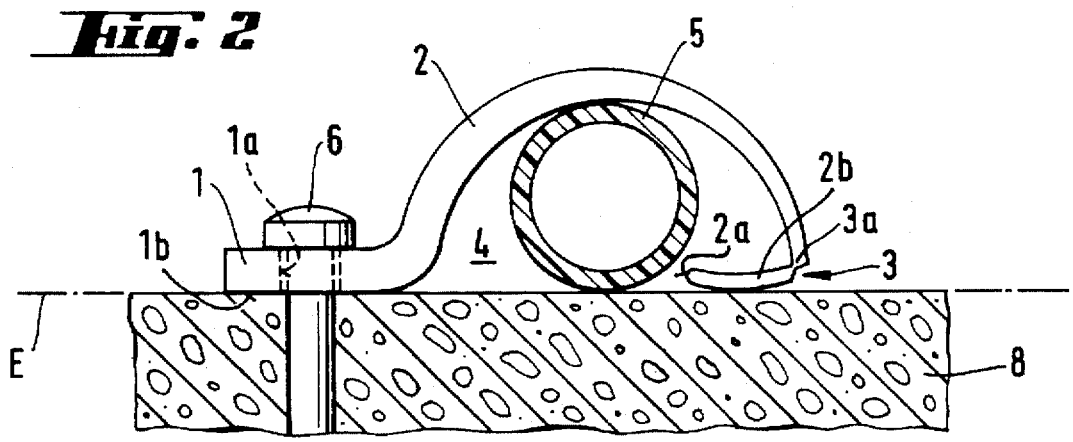
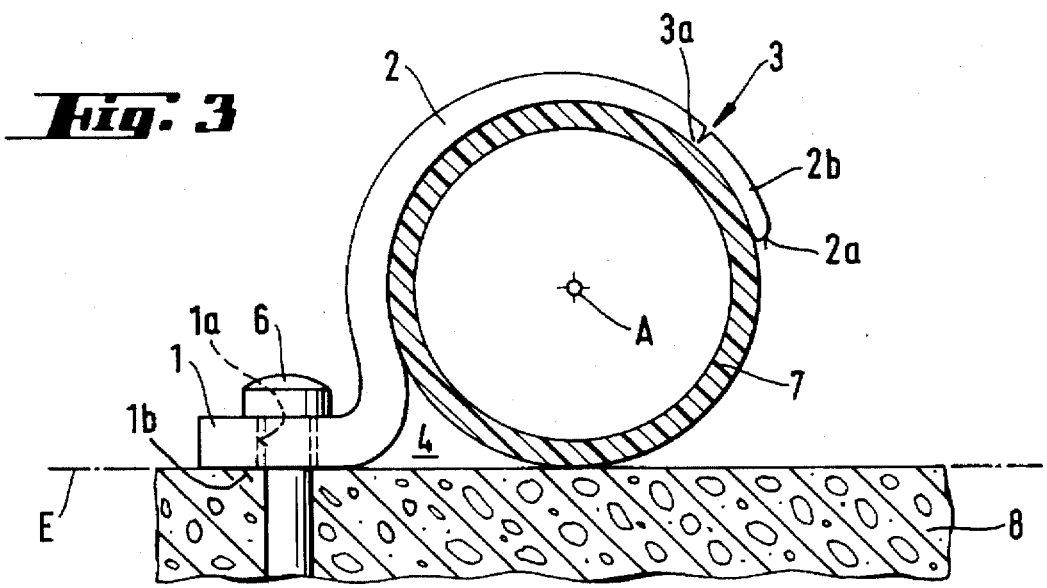

PIPE AND CABLE CLAMP WITH BASE PART AND RECEIVING STRAP

BACKGROUND OF THE INVENTION

The present invention is directed to a pipe and cable clamp having a base portion to be secured to a structural member with at least one arcuately shaped receiving strap having a free end and extending outwardly from the base part for receiving the pipes and cables in at least one receiving space bounded in part by the receiving strap.

Clamps of the above type are used for attaching pipes and cables to structural members. Such pipes are used in many type of installations and cables may be electrical cables and the like.

The pipes and cables are attached in such a manner that they are partially braced by a receiving strap of the clamp while the base part of the clamp is secured to a surface of the structural member. The attachment of the base part to the structural member can be effected in many different ways, for instance by fastening elements in the form of driven nails or in the form of dowels. It is also possible to secure the base part directly to the structural member by bonding, welding or by a positively locked connection such as an appropriately shaped groove or recess.

The receiving strap of the clamps can be shaped in many different ways. A design in common use involves an essentially arcuately shaped receiving strap, whereby a receiving space is formed between the base part and the free end of the strap. The shape of the receiving space can be such that one or several pipes or cables can be held in the receiving space. The number of receiving straps projecting from the base part is not limited to one, accordingly, two or more receiving straps can project from the same base part if they are required for specific attachments.

The pipes and cables to be fastened to the structural member vary to a great extent in their diameter depending upon the individual application and the intended use. Since the pipe and cable clamps in use are formed, as a rule, of more or less elastic material, for instance plastics material, a specific range of diameters can be secured due to such elasticity. If the range of diameters exceeds specific limits, however, clamps of different sizes must be utilized and this strongly affects the economics involving use of the clamps, since the clamp manufacturer has to use different tools and, in addition, storage management is considerably more expensive both for the manufacturer and the user.

Thus, in addition to the use of the known elasticity feature, additional measures have been employed, such as the pipe and cable clamp disclosed in DE PS 26 36 528. In this known clamp, the surface of the base part to be fixed to the surface of the structural member is inclined at a specific angle, so that the pipe and cable clamp can be fastened in different inclined positions.

Even this known clamp along with the elasticity feature is not able to satisfy all of the requirements involved in the range of diameters. Further, certain disadvantages arise in positioning the pipe and cable clamp prior to its attachment, since the base part does not have a sound support surface.

SUMMARY OF THE INVENTION

The primary object of the present invention is to provide a pipe and cable clamp suitable for holding pipes and cables of different diameters and capable of being secured to a structural member without any problems.

In accordance with the present invention, the receiving strap of the pipe and cable clamp has a joint intermediate the base part and the free end of the strap permitting a folding of the region of the strap extending from the free end into the receiving space with the joint having a pivot axis extending parallel to a central axis of the receiving space.

The arrangement of the joint according to the invention affords a variation in the size of the receiving space of the pipe and cable clamp. Folding of the free end region of the receiving strap affords a reduction in the size of the receiving space. Since the free end region can be folded only into the receiving space, such region of the receiving strap in the non-folded state embraces the pipes and cables around the complete circumference of the clamp.

If a pipe or a cable having a smaller diameter, relative to the curvature of the clamp, is to be fastened by the pipe and cable clamp of the invention, the free end region of the receiving strap folds inwardly into the receiving space and bears against the surface of the structural member and in this way effects a reduction in the size of the receiving space whereby the pipe or cable having a smaller diameter is secured in a sufficiently effective manner. On the other hand, if a pipe or cable of larger diameter is secured to the structural member, the size of the receiving space is enlarged due to the elasticity of the pipe and cable clamp as the base part is fixed to the surface of the structural member. In spite of the increase in the size of the receiving space, there is adequate engagement of the pipes or cables to be attached, since the free end region assists in the attachment due to the special arrangement of the joint. Accidental detachment of the pipes or cables of larger diameter is prevented.

To achieve an adequate range in the size of the receiving space, the spacing of the joint from the free end of the receiving strap is approximately in the range of 0.2–0.4 times the arcuate length of the receiving strap.

In particular, due to the decrease in the size of the receiving space when the free end of the receiving strap is folded into the space, it is advantageous if the joint is located in the plane of the surface of the base part to be secured to the surface of the structural member. In the course of fastening the base part to the surface of the structural component with the free end region of the strap contacting the surface of the structural member, the receiving space is reduced to such an extent that the pipes or cables are adequately fixed.

In particular, if a plastics material is used for the pipe and cable clamps, a cross-sectional reduction of the receiving strap forms a preferred embodiment of the joint.

The assure that the free end region of the receiving strap extending from the cross-sectional reduction can be folded only into the receiving space, the remaining cross-section of the joint preferable consists of a web extending parallel to the central access of the receiving space and such web is located adjacent to the receiving space. Accordingly, the cross-sectional reduction of the receiving strap at the joint is located outwardly from the web and forms an adequate arrangement counteracting any outward folding of the free end region in the direction away from the surface of the structural member. Thereby it is assured that the free end region of the receiving strap located outwardly from the joints assists in the retention of the pipe or clamp because it embraces the pipes or clamps of a larger diameter when they are being secured by the clamp.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWINGS

FIG. 1 is a side elevation view of the pipe and cable clamp embodying the present invention;

FIG. 2 is a side view, partly in section, of the pipe and cable clamp in FIG. 1 holding a pipe of a smaller diameter to a structural member; and FIG. 3 is a pipe and cable clamp shown in FIG. 1 securing a pipe of a larger diameter to the structural member.

DETAILED DESCRIPTION OF THE INVENTION

In FIG. 1 a pipe and cable clamp is shown formed of a base part 1 and a receiving strap 2 secured to and curved arcuately outwardly from the base part. The receiving strap has a joint 3 in the form of a cross-sectional reduction or weakening spaced closer to the free end 2a of the strap. The remaining cross-section at the cross-sectional reduction of the strap forms a web 3a extending parallel to a central axis A of a receiving space 4 located between the receiving strap and the surface of the structural member to which the clamp is attached. As illustrated in FIG. 1, the joint is located in a plane E containing the end face 1b of the base portion 1 and displayed in dot-dash lines. As discussed above, the pipe and cable clamp can be fastened by means of the base part 1 to the structural member 8 in many different ways. As an example, if a nail or dowel-like fastening is used, the base part 1 is provided with a through bore 1a through which the fastening element is driven.

FIGS. 2 and 3 show two different situations in the connection of the pipe and clamp, illustrated in FIG. 1, to a structural member 8. In the situation shown in FIG. 2, a pipe 5 having a smaller diameter is fastened to the structural member 8. To effect the fastening of the clamp to the structural member 8, a fastening element 6 is driven through the bore 1a into the structural member. Because of the joint 3, the free end region 2b of the receiving strap 2 is folded inwardly into the receiving space 4 and bears against the surface of the structural member 8, whereby the receiving space has decreased in size and the pipe cable clamp secures the attached pipe in an adequate manner.

In the situation displayed in FIG. 3, a pipe 7 having a larger diameter as compared to the pipe 5 in FIG. 2, is fastened to the structural member 8. In effecting the fastening, the base part 1 is fixed to the surface of the structural component 8 by the fastening element 6, whereby the receiving strap is bent outwardly relative to the base part 1 away from the surface of the structural member 8 due to its elasticity. As a result, there is an overall enlargement of the receiving space 4. FIG. 3 shows clearly, in spite of the enlargement of the receiving space 4, that the receiving strap adequately secures the pipe 7 against the structural member 8 and the free end region 2b aids in such securement, since because of the configuration of the joint 3, the free end region 2b is held against folding outwardly from the remainder of the strap.

According to the invention, plastics material is particularly effective as the material for the pipe and cable clamps. For securing several pipes and cables in size-by-side relation, it is possible to configure the receiving strap so that several side-by-side receiving spaces are formed. In such an arrangement, it is advisable to configure the last receiving space remote from the base part towards the free end of the strap so that its size can be varied by the use of the joint. It is equally possible to vary the base part and the quantity of the receiving straps at a corresponding base part.

While specific embodiments of the invention have been shown and described in detail to illustrate the inventive principles, it will be understood that the invention may be embodied otherwise without departing from such principles.

We claim:

1. Pipe and cable clamp comprises a base part (1) having a planar first surface for attachment to a surface of a structural member (8) and an oppositely facing second surface, at least one generally arcuately shaped elongated receiving strap (2) extending laterally from and curving outwardly from said base part first surface in the direction extending from said first surface towards said second surface and having a free end (2a) spaced outwardly from said base part, at least one receiving space (4) formed between said receiving strap and a plane containing the planar first surface of said base part for receiving at least one of pipe and cable (5, 7) in said receiving space (4), wherein the improvement comprises that said receiving strap (2) having a first surface facing in the direction of said base part first surface and an oppositely facing second surface with a pair of laterally spaced edges bordering said first and second surfaces and a joint (3) spaced intermediate said base part and said free end (2a) and extending between said edges for affording a folding of a section of said receiving strap extending from said free end to said joint into said receiving space, said joint being formed by a cross-sectional reduction of said receiving strap extending from said second surface of said receiving strap towards said first surface thereof and transversely of the elongated direction of said receiving strap, said joint having a pivot axis extending parallel to a central axis (A) of the said receiving space (4) with the central axis extending transversely of the elongated direction of said receiving strap, said first surface arranged to directly contact at least one of the pipe and cable, and said edges extending transversely of said central axis whereby said folding section is adapted to be in a arcuate configuration of said receiving strap in a first position for a first size pipe or cable and in a folded configuration below said receiving strap in a second position for receiving a reduced size pipe or cable.

2. Pipe and cable clamp, as set forth in claim 1, wherein said joint (3) is spaced from said free end (2a) in a range of the 0.2 to 0.4 times a complete arcuate length of said receiving strap (2) extending outwardly from said base part (1).

3. Pipe and cable clamp, as set forth in claim 1 or 2, wherein in a first position before said clamp secures a pipe or cable to a structural member said joint (3) is located in a plane (E) containing the planar first surface of said base part (1).

4. Pipe and cable clamp, as set forth in claim 3, wherein the cross-sectional reduction in the cross-section of said receiving strap (2) forms a web (3a) extending from the first surface of said receiving strap towards and spaced from the second surface thereof and extending parallel to the central axis (A) of said receiving space (4).

* * * * *